J. MacDONNELL.
PNEUMATIC TIRE.
APPLICATION FILED MAR. 25, 1909.
981,208.
Patented Jan. 10, 1911.
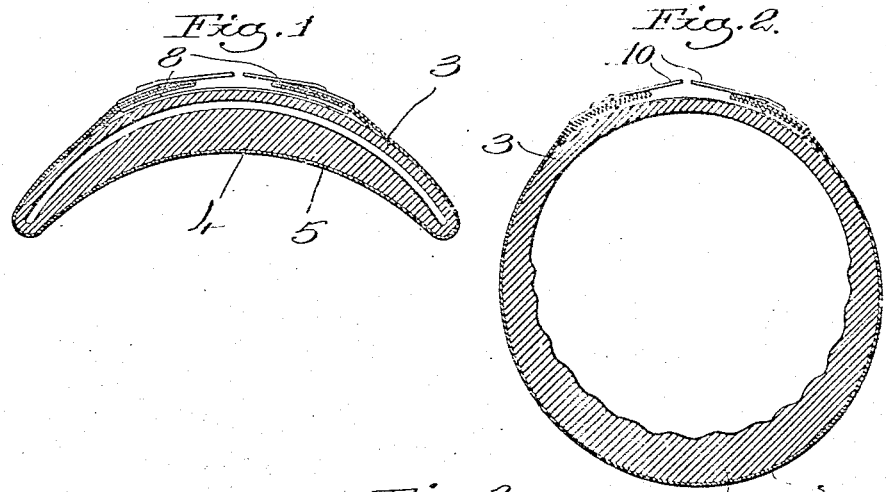
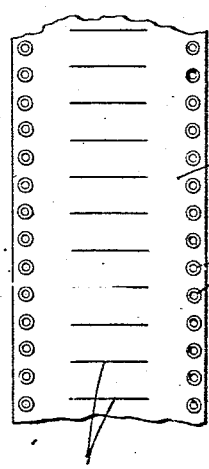
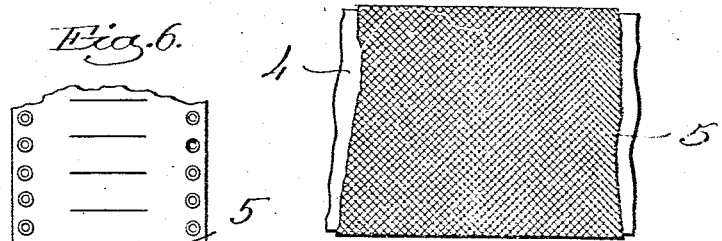
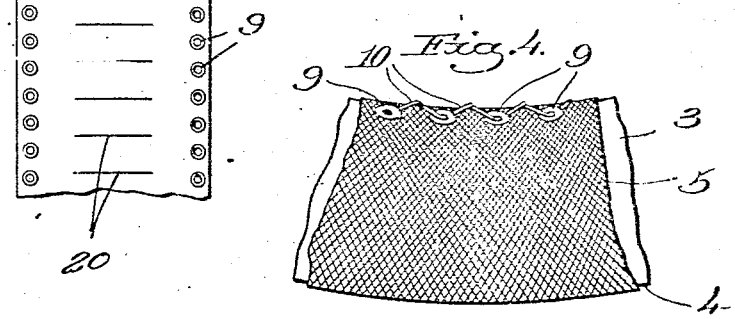
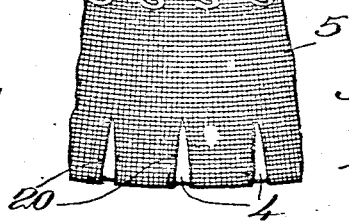
Witnesses:
Frederick S. Greenleaf
Joseph M. Ward
Inventor.
James MacDonnell,
by

UNITED STATES PATENT OFFICE.

JAMES MacDONNELL, OF HAVERHILL, MASSACHUSETTS.

PNEUMATIC TIRE.

981,208. Specification of Letters Patent. Patented Jan. 10, 1911.

Application filed March 25, 1909. Serial No. 485,573.

*To all whom it may concern:*

Be it known that I, JAMES MACDONNELL, a citizen of the United States, residing at Haverhill, county of Essex, and State of Massachusetts, have invented an Improvement in Pneumatic Tires, of which the following description, in connection with the accompanying drawing, is a specification, like letters on the drawing representing like parts.

It has heretofore been proposed to make a pneumatic tire with a tread portion thickened and made of rubber which is held under compression, so that if the tire is punctured the hole will be immediately sealed up as soon as the puncturing body is withdrawn. This construction has been secured by molding the tire tread in a normally depressed position and securing firmly to the exterior of the rubber body a stay strip of canvas or similar material, so that when the tire is inflated the non-stretching qualities of the stay strip will cause the rubber to be compressed. So far as I am aware in all prior attempts to make a tire of this type, the stay strip or backing has been inelastic both transversely and longitudinally. While the inelastic quality in a direction transversely of the tire is essential to maintain the desired compression of the rubber, yet if the backing is not capable of stretching in a direction longitudinally of the tire, then when the tire is inflated, the circumferential length of the tread portion cannot be appreciably increased and the tire will assume its shape when inflated by a compression longitudinally of that portion of the tire opposite the tread.

My present invention is in the nature of an improvement on tires of this class and aims to provide a construction wherein when the tire is inflated the tread portion thereof is held against stretching in a transverse direction, thereby securing the desired compression of the rubber, while at the same time said tread portion can expand or stretch longitudinally to permit the tire to assume its inflated shape without subjecting the portion of the tire opposite the tread to any appreciable longitudinal compression.

I accomplish my desired object by making the stay strip of such a character that it is incapable of stretching transversely but is on the other hand capable of stretching in a direction longitudinally of the tire.

In the drawings I have shown two embodiments of my invention, but the invention is not limited to the constructions herein illustrated.

Figure 1 is a cross section of a tire made in accordance with my invention, said figure showing the form which the tire assumes when it is not inflated; Fig. 2 is a similar view showing the tire after it is inflated; Fig. 3 shows a plan view of a portion of the section of the tread portion of the tire; Fig. 4 is a side elevation of a section of the tire; Fig. 5 is a view similar to Fig. 4 showing a modification of my invention. Fig. 6 shows the stay strip illustrated in Fig. 5.

The pneumatic tire herein illustrated is especially designed for use as an inner tube in a double tube tire, but in the drawings I have not deemed it necessary to show the shoe or outer casing, as the manner in which an inner tire is received within the shoe is well known. The inner tube is shown at 3 and it is in the form of an endless tube of rubber which is molded with the tread portion 4 somewhat thicker than the other portions of the tire. The rubber tire has applied and firmly secured thereto a backing or stay strip 5 which has special characteristics as hereinafter described. The tire is molded in the form shown in Fig. 1 with the tread portion in a normally depressed or concaved position, and during the process of making the tire the stay strip 5 is firmly secured to the outer surface of the tread portion when in its depressed position. While it is not essential to the invention that the envelop or stay strip 5 should entirely inclose the tire, yet I prefer to make it as herein shown, and to provide the edges 8 of the stay strip which extend about the portion of the tire adjacent the rim of the wheel with suitable means, such as eyelets 9 by which they may be connected together by lacing 10.

The stay strip 5 is so made that it is incapable of stretching transversely of the tire, but is capable of stretching in a direction longitudinally of the tire. Since the stay strip cannot stretch in a direction transversely of the tire it will be readily apparent that when the tire is inflated, as shown in Fig. 2, the rubber forming the thickened tread portion of the tire will be put under considerable compression due to the fact that the outer face of the rubber is not permitted to expand because of the presence of the stay strip. It will also be apparent that when the tread portion 4 is forced outwardly as the tire is inflated the circumferenceᴬ longitudinally of said tread portion is increased considerably in length, but owing to the fact that the stay strip which I employ is capable of stretching longitudinally, the presence of the stay strip does not interfere in any way with such increase in length.

The stay strip having the capacity of stretching longitudinally while being incapable of stretching transversely may be made in a variety of ways. One way of thus making the stay strip is to cut it on the bias, that is, to so form the stay strip that the warp and weft threads extend diagonally across the width of the strip, as seen in Figs. 3 and 4. Where this construction is employed, the stay strip is capable of stretching longitudinally as required to accommodate the increasing circumferential length of the tire as it is inflated, and such longitudinal stretching results in tending to draw the edges of the stay strip together as will be obvious. This tendency not only counteracts any tendency of the strip to stretch transversely and thus makes the stay strip inelastic transversely, but also tends to actually decrease the width of the stay strip and thus augments the compression under which the rubber forming the tread portion 4 is placed.

In Figs. 5 and 6 I have shown another embodiment of my invention wherein the stay strip is provided with slits through its central portion to permit of the necessary longitudinal stretching of the portion which overlies the tread of the tire. In this case the warp threads extend longitudinally of the stay strip and the weft threads extend transversely thereof, but the slits 20 formed in the stay strip permit the necessary elongation thereof at the tread portion of the tire.

From the above it will be seen that my invention comprehends the use of a stay strip for securing the desired compression of the tread portion of the tire which stay strip is incapable of stretching transversely but which is capable of stretching longitudinally to permit of the natural inflation of the tire.

Having fully described my invention, what I claim as new and desire to secure by Letters Patent is:—

1. A pneumatic tire of rubber having its tread portion formed in a normally depressed position and provided with a stay strip which is firmly secured to the outer side of the tread portion and which is non-extensible transversely but is longitudinally extensible whereby when the tire is inflated the tread portion thereof can expand longitudinally while the rubber forming said tread portion is held under compression transversely.

2. A pneumatic tire of rubber having the material of its tread portion in a highly-compressed state in a direction transversely of the tire, and a stay strip firmly secured to the outside of the tread portion, which stay strip is non-stretchable in a direction transversely of the tire but is capable of stretching in a direction longitudinally of the tire.

3. A pneumatic tire of rubber having the material of its tread portion in a highly-compressed state in a direction transversely of the tire, and a stay strip firmly secured to the outside thereof, which stay strip is formed of a woven fabric cut on the bias.

4. A pneumatic tire of rubber having the material of its tread portion in a highly-compressed state in a direction transversely of the tire, and a stay strip firmly secured to the outside of the tire, which stay strip is capable of stretching in a direction longitudinally of the tire and which is decreased in width by such longitudinal stretching.

In testimony whereof, I have signed my name to this specification, in the presence of two subscribing witnesses.

JAMES MacDONNELL.

Witnesses:
  J. FRANK BATCHELDER,
  DANIEL J. CARAN.